(12) United States Patent
Imai et al.

(10) Patent No.: US 9,768,981 B2
(45) Date of Patent: Sep. 19, 2017

(54) TUNNEL MANAGEMENT DEVICE, COMMUNICATION CONTROL DEVICE, AND TUNNEL MANAGEMENT METHOD

(71) Applicant: FUJITSU LIMITED, Kawasaki-shi, Kanagawa (JP)

(72) Inventors: Satoshi Imai, Kawasaki (JP); Noboru Terai, Kawasaki (JP); Ryotaro Matsushita, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 230 days.

(21) Appl. No.: 14/488,382

(22) Filed: Sep. 17, 2014

(65) Prior Publication Data

US 2015/0156034 A1    Jun. 4, 2015

(30) Foreign Application Priority Data

Nov. 29, 2013    (JP) .................................. 2013-248704

(51) Int. Cl.
    *H04L 12/46*    (2006.01)
    *H04L 12/715*   (2013.01)
    *H04L 12/735*   (2013.01)

(52) U.S. Cl.
    CPC ...... *H04L 12/4633* (2013.01); *H04L 12/4641* (2013.01); *H04L 45/128* (2013.01); *H04L 45/64* (2013.01)

(58) Field of Classification Search
    CPC ... H04L 12/4633; H04L 45/64; H04L 45/128; H04L 12/4641
    See application file for complete search history.

(56) References Cited

U.S. PATENT DOCUMENTS

| | | | | |
|---|---|---|---|---|
| 6,069,894 A * | 5/2000 | Holender | ........... | H04Q 11/0478 370/397 |
| 7,249,169 B2 * | 7/2007 | Blouin | ................ | H04L 12/2602 709/201 |
| 7,283,741 B2 * | 10/2007 | Sadananda | .............. | H04L 45/02 398/5 |
| 7,391,730 B1 * | 6/2008 | Chandra | ............... | H04L 45/021 370/236 |
| 2003/0039212 A1 * | 2/2003 | Lloyd | ................. | H04L 12/2602 370/235 |
| 2003/0065811 A1 * | 4/2003 | Lin | ..................... | H04L 12/5695 709/232 |

(Continued)

FOREIGN PATENT DOCUMENTS

| | | |
|---|---|---|
| JP | 7-162422 | 6/1995 |
| JP | 2005-286923 | 10/2005 |
| JP | 2008-182423 | 8/2008 |

OTHER PUBLICATIONS

Japanese Office Action dated Jul. 18, 2017 in related Japanese Patent Application No. 2013-248704**.

*Primary Examiner* — Redentor Pasia
(74) *Attorney, Agent, or Firm* — Staas & Halsey LLP

(57) ABSTRACT

A tunnel management device includes: a central processing unit configured to manage a tunnel that establishes a virtual network to be overlaid on a IP network; and a memory coupled to the central processing unit, wherein the central processing unit: extracts a second tunnel in the virtual network that uses a second route in the IP network where a number of times a portion of a first route in the IP network is used by a first tunnel in the virtual network is used is minimized.

12 Claims, 13 Drawing Sheets

(56) References Cited

U.S. PATENT DOCUMENTS

| | | | |
|---|---|---|---|
| 2004/0247317 A1* | 12/2004 | Sadananda | H04L 45/02 398/57 |
| 2012/0099443 A1* | 4/2012 | Makishima | H04L 43/10 370/248 |
| 2013/0013809 A1* | 1/2013 | Vasseur | H04L 45/22 709/239 |
| 2014/0068105 A1* | 3/2014 | Thubert | H04L 45/128 709/239 |

* cited by examiner

|  |  | ROUTE | | | | | | |
|---|---|---|---|---|---|---|---|---|
|  |  | L1 | L2 | L3 | L4 | L5 | L6 | L7 |
| ROUTER ID | A | 1 |  |  | 2 | 5 |  |  |
|  | B |  |  |  |  | 5 | 1 |  |
|  | C |  |  |  |  |  | 1 | 2 |
|  | D |  |  | 5 | 2 |  |  | 2 |
|  | E |  | 3 | 5 |  |  |  |  |
|  | F | 1 | 3 |  |  |  |  |  |

FIG. 9

| | CURRENTLY USED TUNNEL | | | | | | |
|---|---|---|---|---|---|---|---|
| | | 1 | 2 | 3 | 4 | 5 | 6 | TUNNEL ID
| | | 1-2 | 1-3 | 1-4 | 2-3 | 2-4 | 3-4 |
| ROUTE | L1 | | | 1 | | | |
| | L2 | | | 1 | | | |
| | L3 | | | | | (1) | (1) |
| | L4 | | 1 | | | | |
| | L5 | 1 | | | | | |
| | L6 | | | | (1) | (1) | |
| | L7 | | | | (1) | (1) | |

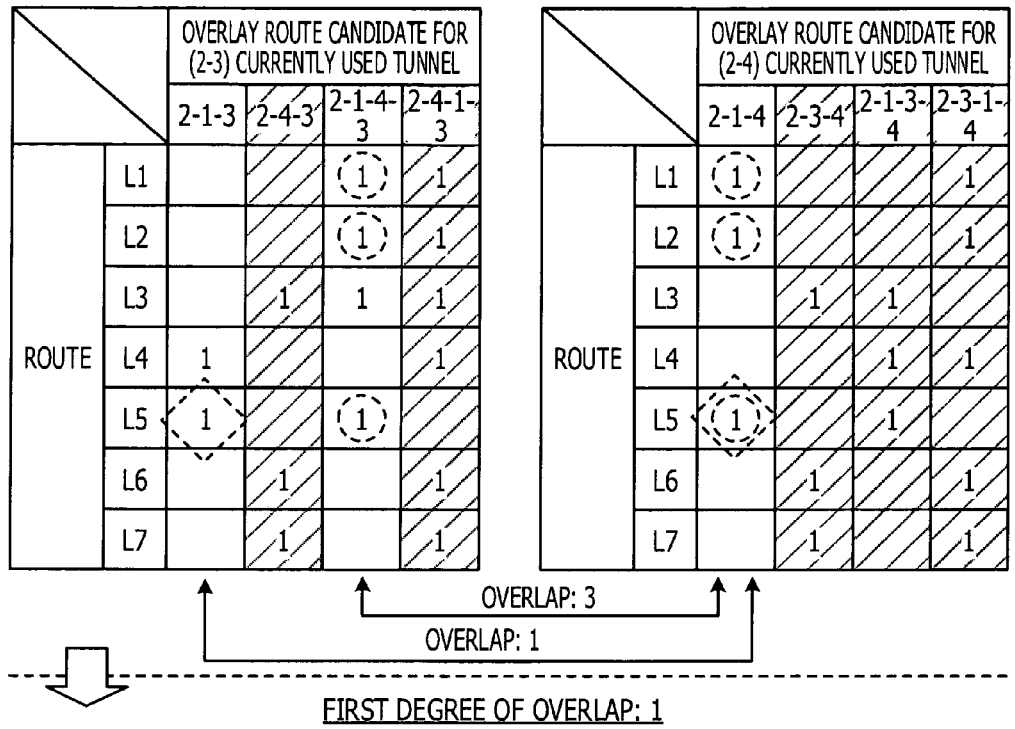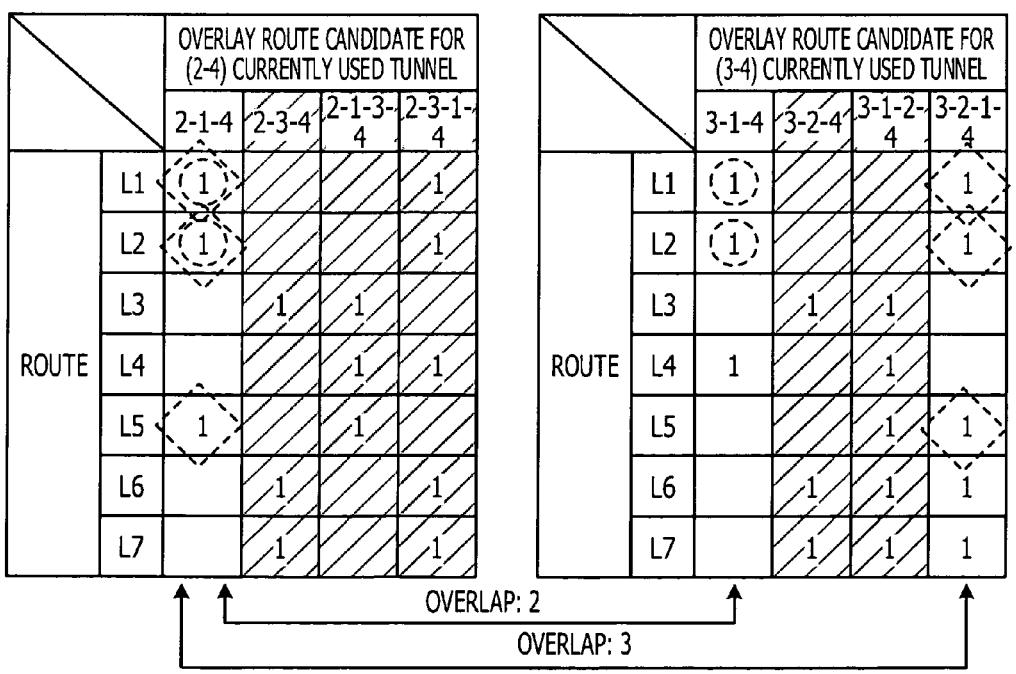
FIG. 10

FIG. 11

FIRST DEGREE OF OVERLAP: 0

| | | OVERLAY ROUTE CANDIDATE FOR (1-2) CURRENTLY USED TUNNEL | | | |
|---|---|---|---|---|---|
| | | 1-3-2 | 1-4-2 | 1-3-4-2 | 1-4-3-2 |
| ROUTE | L1 | | 1 | | 1 |
| | L2 | | 1 | | 1 |
| | L3 | | 1 | 2 | 1 |
| | L4 | 1 | | 1 | |
| | L5 | | | | |
| | L6 | 1 | 1 | 1 | 1 |
| | L7 | 1 | 1 | 1 | 1 |
| ROUTE | | 3 | 5 | 5 | 5 |

| | | OVERLAY ROUTE CANDIDATE FOR (1-3) CURRENTLY USED TUNNEL | | | |
|---|---|---|---|---|---|
| | | 1-2-3 | 1-4-3 | 1-2-4-3 | 1-4-2-3 |
| ROUTE | L1 | | 1 | | 1 |
| | L2 | | 1 | | 1 |
| | L3 | | 1 | 2 | 1 |
| | L4 | | | | |
| | L5 | 1 | | 1 | |
| | L6 | 1 | | 1 | 2 |
| | L7 | 1 | | 1 | 2 |
| ROUTE | | 3 | 3 | 5 | 7 |

| | | OVERLAY ROUTE CANDIDATE FOR (1-4) CURRENTLY USED TUNNEL | | | |
|---|---|---|---|---|---|
| | | 1-2-4 | 1-3-4 | 1-2-3-4 | 1-3-2-4 |
| ROUTE | L1 | | | | |
| | L2 | | | | |
| | L3 | 1 | 1 | 1 | 1 |
| | L4 | | 1 | | 1 |
| | L5 | 1 | | 1 | |
| | L6 | 1 | | 1 | 2 |
| | L7 | 1 | | 1 | 2 |
| ROUTE | | 4 | 2 | 4 | 6 |

FIG. 13

|  |  | OVERLAY ROUTE CANDIDATE FOR (1-2) CURRENTLY USED TUNNEL | | | |
|---|---|---|---|---|---|
|  |  | 1-3-2 | 1-4-2 | 1-3-4-2 | 1-4-3-2 |
| PHYSICAL ROUTE | L1 | 1 |  | 1 × 1 |  | 1 × 1 |
|  | L2 | 5 |  | 1 × 5 |  | 1 × 5 |
|  | L3 | 1 |  | 1 × 1 | 2 × 1 | 1 × 1 |
|  | L4 | 10 | 1 × 10 |  | 1 × 10 |  |
|  | L5 | 10 |  |  |  |  |
|  | L6 | 1 | 1 × 1 | 1 × 1 | 1 × 1 | 1 × 1 |
|  | L7 | 1 | 1 × 1 | 1 × 1 | 1 × 1 | 1 × 1 |
| INDEX SUM | | | 12 | 9 | 14 | 9 |
| PROCESSING DELAY SUM | | | 16 | 8 | 18 | 18 |

PROCESSING DELAY OF NODE 1: 5
PROCESSING DELAY OF NODE 2: 1
PROCESSING DELAY OF NODE 3: 10
PROCESSING DELAY OF NODE 4: 2

TUNNEL MANAGEMENT DEVICE, COMMUNICATION CONTROL DEVICE, AND TUNNEL MANAGEMENT METHOD

CROSS-REFERENCE TO RELATED APPLICATION

This application is based upon and claims the benefit of priority of the prior Japanese Patent Application No. 2013-248704, filed on Nov. 29, 2013, the entire contents of which are incorporated herein by reference.

FIELD

The embodiments discussed herein are related to a tunnel management device, a communication control device, and a tunnel management method.

BACKGROUND

An Internet Protocol network (IP network) such as the Internet or a Wide Area Network (WAN: wide area communication network) is called, for example, substrate network, and includes various kinds of packet relay devices such as a IP router for relaying packets and an Layer 3 (L3) switch.

A related technique is disclosed in Japanese Laid-open Patent Publication No. 7-162422 or Japanese Laid-open Patent Publication No. 2008-182423.

SUMMARY

According to an aspect of the embodiments, a tunnel management device includes: a central processing unit configured to manage a tunnel that establishes a virtual network to be overlaid on a IP network; and a memory coupled to the central processing unit, wherein the central processing unit: extracts a second tunnel in the virtual network that uses a second route on the IP network where a number of times a portion of a first route in the IP network is used by a first tunnel in the virtual network is used is minimized.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 9 illustrates an example of processing for calculating a first degree of overlap;

FIG. 10 illustrates an example of processing for selecting a overlay route candidate in a case where a first degree of overlap exists;

FIG. 11 illustrates an example of processing for selecting a overlay route candidate in a case where a first degree of overlap does not exist;

FIG. 13 illustrates an example of selection of a overlay route candidate.

DESCRIPTION OF EMBODIMENTS

An overlay network that is overlaid on an IP network is called, for example, a virtual network, and includes nodes arranged for respective points of the IP network. The nodes communicate with one another using tunnels serving as virtual private lines. Based on the overlay network, communication that is performed on the IP network is controlled. For example, control for increasing communication quality between the points of the IP network is performed.

The tunnels include a currently-used tunnel and a stand-by or a backup tunnel (hereinafter, simply referred to as a backup tunnel). The backup tunnel is a preliminary tunnel that stands by while an operation is performed using the currently-used tunnel of the system and, is used for routing the currently-used tunnel in a case where a failure occurs in the backup tunnel. The currently-used tunnel and the backup tunnel are set in each node by a tunnel management device that manages tunnels. The currently-used tunnel and the backup tunnel are established between the nodes.

In a case where a failure occurs in the currently-used path route in a communication network, the currently-used path route is switched to the backup path route For example, when a failure occurs in the currently-used path route, a provisional path route for route is set. If the same nodes are redundantly used on the set path route for route, the path route for route between the nodes is deleted, and a new path route for route is reset. Using integer programming, routes of a backup path group where the route cost of the entire backup path group is minimized are obtained, the entire backup path group routing the currently-used path and each link through which the currently-used path passes.

For example, in a case where a failure occurs on the IP network in a state in which the backup tunnels are preliminarily set in a limited way, if a failure point is used by both a currently-used tunnel and a backup tunnel, the backup tunnel may not route the currently-used tunnel.

Figure 1:
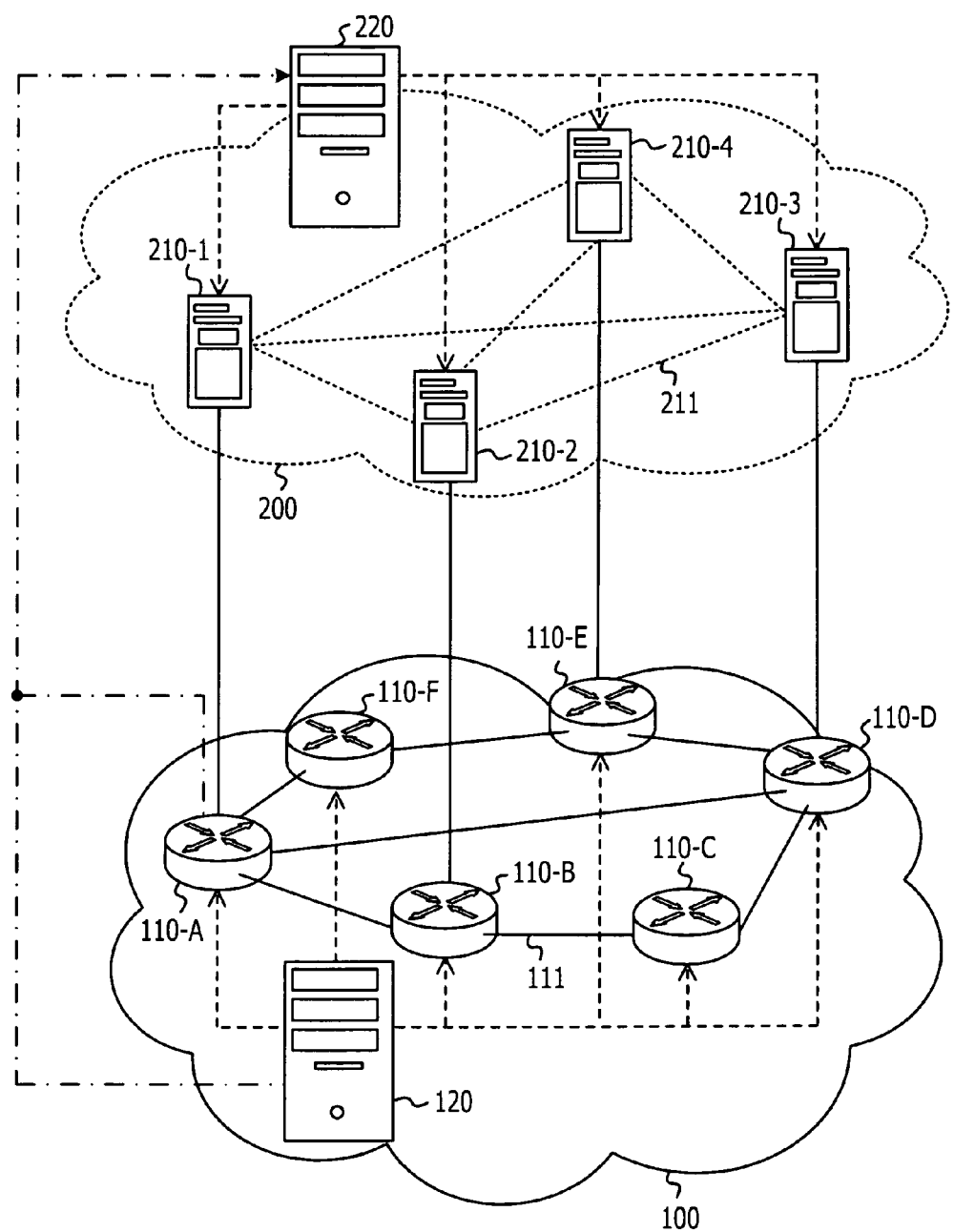
FIG. 1 illustrates an example of a relationship between an IP network and an overlay network.

FIG. 1 illustrates an example of a relationship between an IP network and a overlay network. As illustrated in FIG. 1, an overlay network 200 may be a virtual network to be overlaid on the IP network 100. The overlay network 200 may be called a logical network logically formed, compared with the IP network 100 formed.

The IP network 100 includes IP routers 110-A, . . . , and 110-F and a network manager 120. While, in FIG. 1, the network manager 120 is arranged inside of the IP network 100, the network manager 120 may be arranged outside of the IP network 100.

The IP router 110-A, . . . , and 110-F each relay received packets. For example, in a case of receiving a packet from the adjacent IP router 110-B, the IP router 110-C relays the packet to the adjacent IP router 110-D. Some of the IP routers 110-A, . . . , and 110-F are connected to at least two other IP routers out of the IP routers 110-A, . . . , and 110-F by a communication cable 111. The IP router 110-A is coupled to, for example, the IP routers 110-B, 110-D, and 110-F. Therefore, the IP router 110-A directly relays packets to the IP routers 110-B, 110-D, and 110-F. It is difficult for the IP router 110-A to directly relay packets to the IP routers 110-C and 110-E. The IP router 110-A, . . . , and 110-F may each include an Open Shortest First Path (OSPF) serving as one of routing protocols, or the like. As the communication cable 111, for example, a metal cable, an optical fiber cable, or the like may be used.

The network manager 120 manages the IP network 100. For example, the network manager 120 manages link state information including a coupling state between two IP routers adjacent to each other and included on the IP network 100, for example, the IP router 110-A and the IP router 110-B, for example, Link-State Advertisement (LSA) in a case of the OSPF protocol. The network manager 120 calculates a cost, based on the bandwidth of the communication cable 111. The calculated cost is included in the link state information. The cost may be an index indicating a distance of each link set by an operator, or the like. A relay load of a packet decreases with a decrease in the cost. In a case where there are a plurality of relay routes as far as the destination of the packet, the packet may be relayed using a relay route where the sum of costs is minimized.

The overlay network 200 includes nodes 210-1, . . . , and 210-4 and a tunnel manager 220. While, in FIG. 1, the tunnel manager 220 is arranged inside of the overlay network 200, the tunnel manager 220 may be arranged outside of the overlay network 200.

The nodes 210-1, . . . , and 210-4 control communication performed in the IP network 100 using the IP routers 110-A, . . . , and 110-F. The nodes 210-1, . . . , and 210-4 couple a communication network to another communication network whose protocol is different therefrom. The nodes 210-1, . . . , and 210-4 may be, for example, gateways, and perform connection from a physical layer to an application layer (Layer 7) for the IP routers 110-A, . . . , and 110-F that perform connection from a physical layer (Layer 1) to a network layer (Layer 3). Therefore, the nodes 210-1, . . . , and 210-4 provide higher or more complicated communication service than the IP routers 110-A, . . . , and 110-F, using a layer located above the network layer, for example, the application layer. Such communication service may include, for example, improvement of communication quality, ensuring of security, and so forth.

The nodes 210-1, . . . , and 210-4 may be arranged in each point or end point of the IP network 100. As illustrated in, for example, in FIG. 1, the nodes 210-1, . . . , 210-4 are connected to the IP routers 110-A, 110-B, 110-D, and 110-E, respectively, arranged in points of the IP network 100. Therefore, if, for example, the IP router 110-A receives a packet, the packet is transmitted to the node 210-1 first. In the node 210-1, after various kinds of processing operations defined in the node 210-1 are performed on the packet, the packet is relayed to the IP router 110-B, the IP router 110-D, or the like. The IP router 110-A, 110-B, 110-D, and 110-E arranged in the points may be referred to as, for example, edge routers. The IP routers 110-C and 110-F arranged outside of the points may be referred to as, for example, core routers.

The nodes 210-1, . . . , and 210-4 perform communication with one another using tunnels 211 serving as virtual private lines. As the tunnels 211, for example, Generic Routing Encapsulation (GRE) or Ethernet (registered trademark) over IP may be used. In the GRE, packets of an arbitrary protocol are encapsulated within the tunnels. The Ethernet (registered trademark) over IP is defined in, for example, Request For Comments (RFC) 3378. In the Ethernet (registered trademark) over IP, received Ethernet (registered trademark) frames are bridge-transferred through the tunnels 211 on the IP network 100.

The tunnel manager 220 manages the tunnels 211 for establishing the overlay network 200. The tunnel manager 220 sets the tunnels 211 in, for example, the nodes 210-1, . . . , and 210-4. The tunnel manager 220 manages the set tunnels 211. If, for example, a failure caused by a communication failure of the IP network 100, for example, disconnection, occurs in one of the tunnels 211, the tunnel manager 220 sets, in the nodes 210-1, . . . , and 210-4, another tunnel 211 as a overlay route for the corresponding tunnel 211 in which the failure occurs. Therefore, communication utilizing the tunnels is continued. The tunnel manager 220 acquires the link state information from, for example, one of the IP routers 110-A, . . . , and 110-F or the network manager 120.

Figures 2A, 2B:
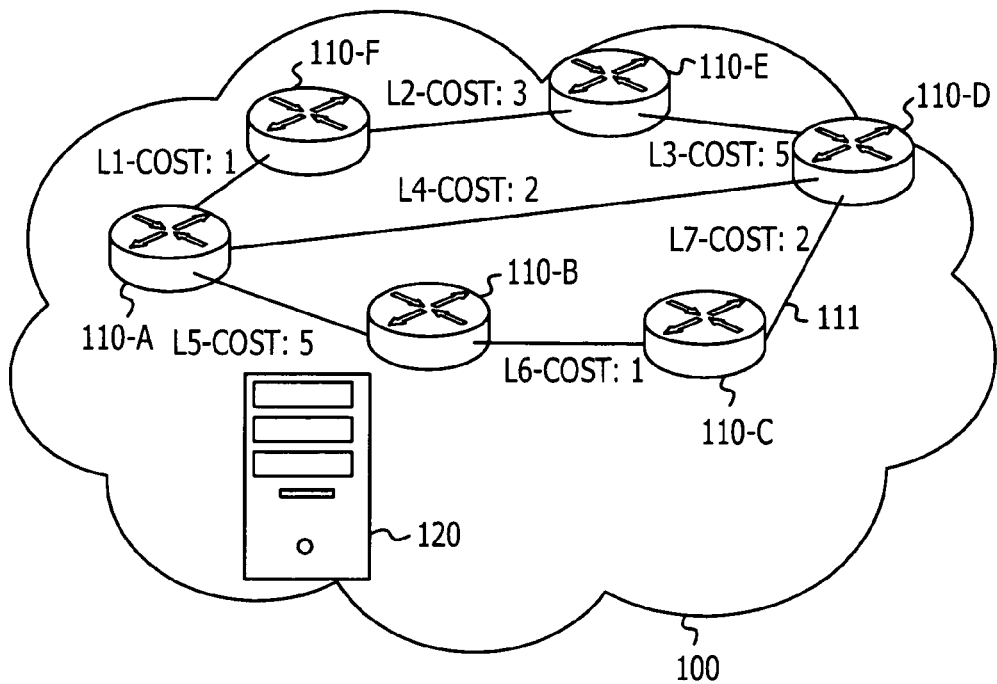
FIG. 2A illustrates an example of the IP network.
FIG. 2B illustrates an example of a link state database.

FIG. 2A illustrates an example of the IP network. As illustrated in FIG. 2A, between two adjacent IP routers (for example, the IP router 110-A and the IP router 110-F), route on the IP network, "L1", . . . , and "L7", and the costs of the routes on the IP network, "L1", . . . , and "L7", are illustrated. For example, the IP router 110-A and the IP router 110-F are coupled to each other by the route "L1", and the cost of the physical route on the IP network "L1" is "1". The costs of the respective physical routes on the IP network "L1", . . . , and "L7" may be calculated based on the distance or the like of the communication cable 111. The IP routers 110-A, . . . , and 110-F and the network manager 120 manage, as the link state information, the calculated costs of the respective routes on the IP network "L1", . . . , and "L7" while associating each of the calculated costs of the respective physical routes on the IP network "L1", . . . , and "L7" with a coupling state between two adjacent IP routers.

FIG. 2B illustrates an example of a link state database. The IP routers 110-A, . . . , and 110-F and the network manager 120 each include a link state database. As illustrated in FIG. 2B, the link state database may include a correspondence relationship between the route on the IP network "L1", . . . , or "L7" and a router ID "A", . . . , or "F" for identifying an IP router. The routers ID "A", . . . , and "F" may correspond to the symbols of the IP routers 110-A, . . . , and 110-F, respectively. In the link state database, for example, the link state information of the route on the IP network "L1" indicates, for example, that the IP router 110-A and the IP router 110-F are coupled to each other, and indicates, for example, that the cost of the route on the IP network "L1" is "1". The same applies to the link state information of each of the route on the IP network "L2", . . . , and "L7".

Figure 3:
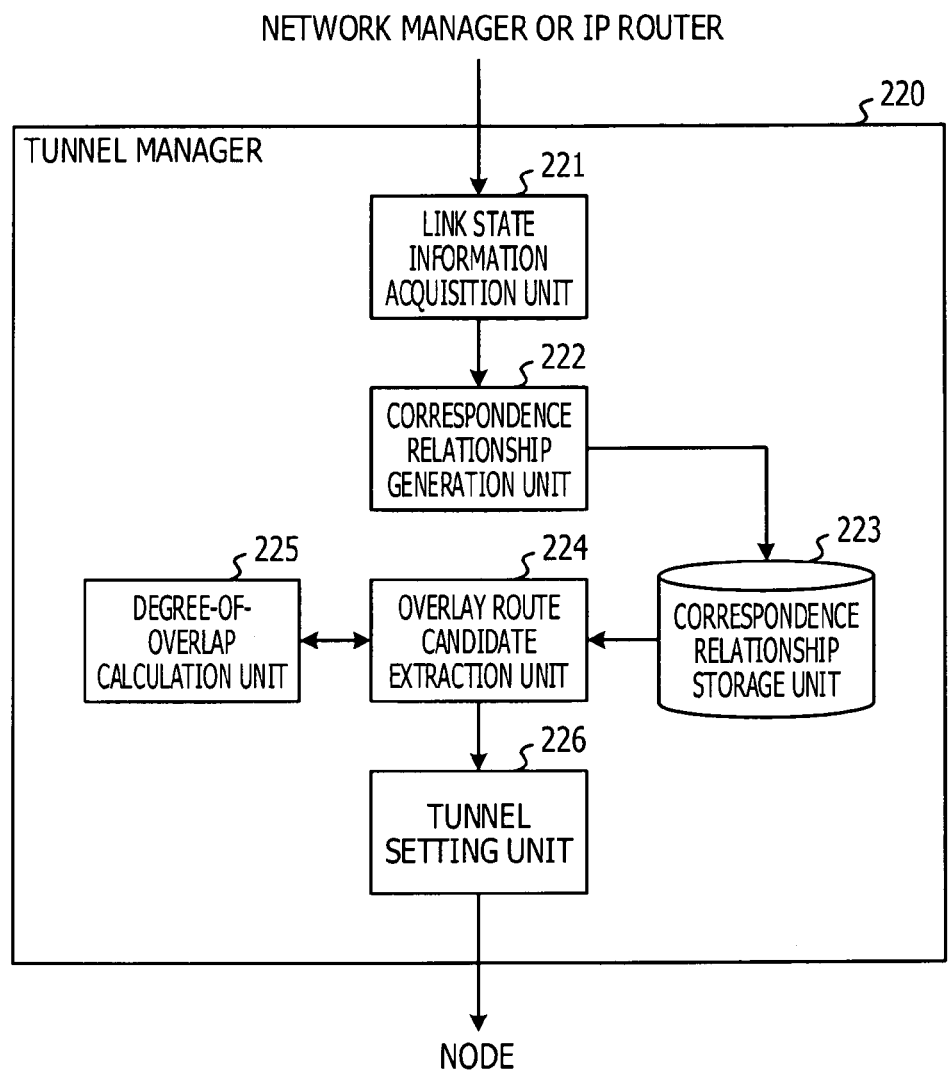
FIG. 3 illustrates an example of a tunnel manager.

FIG. 3 illustrates an example of a tunnel manager. FIG. 3 illustrates the block diagram of the tunnel manager. The tunnel manager 220 illustrated in FIG. 3 includes a link state information acquisition unit 221, a correspondence relationship generation unit 222, a correspondence relationship storage unit 223, a overlay route candidate extraction unit 224, a degree-of-overlap calculation unit 225, and a tunnel setting unit 226.

The link state information acquisition unit 221 acquires the link state information from one of the IP routers 110-A, . . . , and 110-F, or the network manager 120. The link state information acquisition unit 221 outputs the acquired link state information to the correspondence relationship generation unit 222.

Based on the link state information, the correspondence relationship generation unit 222 generates a first correspondence relationship between first shortest routes on the IP network used by the respective currently-used tunnels 211 (hereinafter, called currently used tunnels) and the respective currently used tunnels. Based on the first correspondence relationship, the correspondence relationship generation unit 222 generates a second correspondence relationship between second shortest routes on the IP network used by respective overlay route candidates for the currently used tunnel and the respective overlay route candidates. Based on, for example, the link state information output from the link state information acquisition unit 221 and a least-cost route calculation method such as Dijkstra, the correspondence relationship generation unit 222 generates the first correspondence relationship between the first shortest routes on the IP network and the respective currently used tunnels. Based on the generated first correspondence relationship, the correspondence relationship generation unit 222 generates the second correspondence relationship between the second shortest routes on the IP network used by the respective overlay route candidates and the respective overlay route candidates, for each currently used tunnel. The correspondence relationship generation unit 222 saves the generated first correspondence relationship and the generated second correspondence relationship in the correspondence relationship storage unit 223. The Dijkstra calculation method may be an algorithm for calculating the cost of a route leading from a start to a goal and defining, as the shortest route, a route whose cost is minimized. A commonly known Dijkstra calculation method may be used.

The overlay route candidate extraction unit 224 extracts a second tunnel in the overlay network 200, which uses a second route on the IP network 100 where the number of times, a portion of a first route on the IP network 100 used by a first tunnel in the overlay network 200 is used, is minimized. The overlay route candidate extraction unit 224 may extract, for example, the second tunnel utilizing a route not including a portion of the first route. Based on, for example, comparison between the first shortest route on the IP network used by one of the currently used tunnels and the second shortest routes on the IP network used by the respective overlay route candidates, the overlay route candidate extraction unit 224 extracts a overlay route candidate utilizing the second shortest route not including the first shortest route. The overlay route candidate extraction unit 224 extracts, for example, the first correspondence relationship and the second correspondence relationship from the correspondence relationship storage unit 223. In addition, based on comparison between one of the first shortest routes on the IP network of the extracted first correspondence relationship and the second shortest routes on the IP network of the extracted second correspondence relationship, the overlay route candidate extraction unit 224 may extract a overlay route candidate utilizing the second shortest route on the IP network not including the first shortest route on the IP network. Upon finishing the extraction of the overlay route candidate, the overlay route candidate extraction unit 224 outputs the extracted overlay route candidate to the degree-of-overlap calculation unit 225 along with the first correspondence relationship. In a case where it is difficult to extract the overlay route candidate, the overlay route candidate extraction unit 224 may extract a overlay route candidate where the number of times, a portion of the first shortest route on the IP network is used, is minimized. The shortest route on the IP network may be used, and a route on the IP network and the currently used tunnel or a overlay route candidate for the currently used tunnel may be associated with each other, based on another condition.

The degree-of-overlap calculation unit 225 calculates the first degree of overlap between the first route and a third route used by a third tunnel and the second degree of overlap between the second route and a fourth route on the IP network 100 where the number of times a portion of the third route used by the third tunnel is used is minimized. Based on, for example, the first correspondence relationship output from the overlay route candidate extraction unit 224, the degree-of-overlap calculation unit 225 calculates the first degree of overlap between the first shortest route on the IP network used by the currently used tunnel and a first shortest route on the IP network used by the other currently used tunnel. With respect to each calculated first degree of overlap, the degree-of-overlap calculation unit 225 calculates the second degrees of overlap between the second shortest routes on the IP network used by the respective overlay route candidates for the currently used tunnel, extracted by the overlay route candidate extraction unit 224, and the second shortest routes on the IP network used by the respective overlay route candidates for the other currently used tunnel. Based on the calculated second degrees of overlap, the overlay route candidate extraction unit 224 selects the overlay route candidate for the currently used tunnel and the overlay route candidate for the other currently used tunnel. In a case where the first degree of overlap, calculated by the degree-of-overlap calculation unit 225, does not exist, a overlay route candidate for the currently used tunnel where the route length of the second shortest route on the IP network used by the overlay route candidate for the currently used tunnel is minimized may be selected. The selected overlay route candidate for the currently used tunnel and the selected overlay route candidate for the other currently used tunnel are output from the overlay route candidate extraction unit 224 to the tunnel setting unit 226.

The tunnel setting unit 226 sets a tunnel. Based on the overlay route candidate for the currently used tunnel and the overlay route candidate for the other currently used tunnel, which are output from the overlay route candidate extraction unit 224, the tunnel setting unit 226 sets, in the nodes 210-1, . . . , and 210-4, a tunnel (hereinafter, referred to as a route tunnel) that connects the currently used tunnels. Therefore, the tunnel route is set in the nodes 210-1, . . . , and 210-4.

Figure 4:
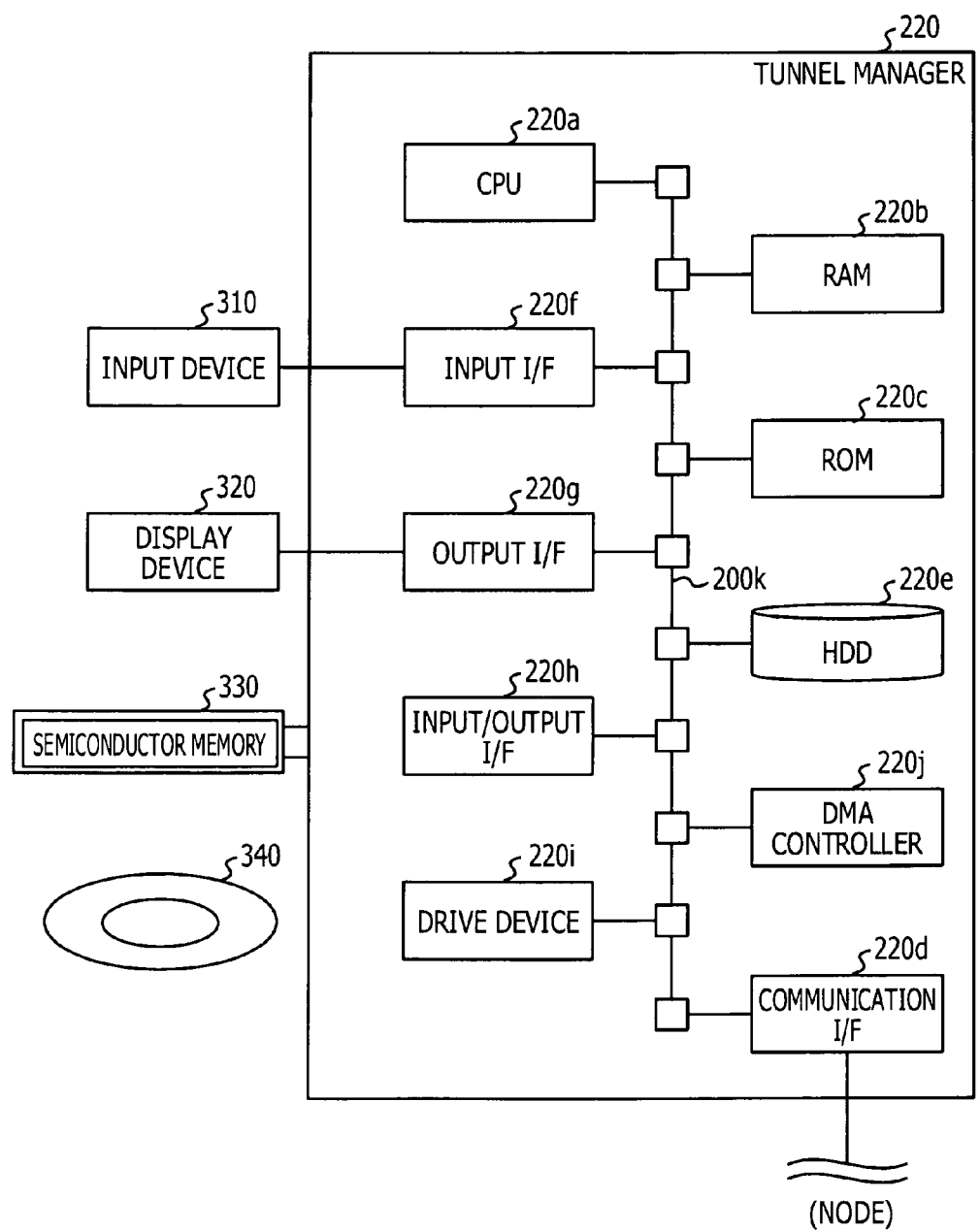
FIG. 4 illustrates an example of the tunnel manager.

FIG. 4 illustrates an example of a tunnel manager. FIG. 4 illustrates the hardware configuration of the tunnel manager 220. The network manager 120 illustrated in FIG. 1 or FIG. 2A may have a configuration substantially equal to or similar to the tunnel manager 220 illustrated in FIG. 4. The tunnel manager 220 includes at least a Central Processing Unit (CPU) 220a, a Random Access Memory (RAM) 220b, a Read Only Memory (ROM) 220c, and a communication I/F (interface) 220d. The tunnel manager 220 may include at least one of a Hard Disc Drive (HDD) 220e, an input I/F 220f, an output I/F 220g, an input-output I/F 220h, a drive device 220i, and a DMA controller 220j. These individual devices 220a to 220j may be coupled to one another by the internal bus 220k. At least the CPU 220a and the RAM 220b collaborate with each other, and hence, a computer is realized.

An input device 310 is coupled to the input I/F 220f. As the input device 310, for example, a keyboard, a mouse, or the like may be used. A display device 320 is coupled to the output I/F 220g. As the display device 320, for example, a liquid crystal display may be used. A semiconductor memory 330 is coupled to the input-output I/F 220h. As the semiconductor memory 330, for example, a Universal Serial Bus (USB) memory, a flash memory, or the like may be used. The input-output I/F 220h reads out a program and data stored in the semiconductor memory 330. The input I/F 220f and the input-output I/F 220h may include, for example, USB ports. The output I/F 220g may include, for example, a display port.

A portable recording medium 340 is inserted into the drive device 220i. As the portable recording medium 340, a removable disk, for example, a Compact Disc (CD)-ROM or a Digital Versatile Disc (DVD), may be used. The drive device 220i reads out a program and data recorded in the portable recording medium 340. The communication I/F 220d includes, for example, a port and a Physical Layer Chip (PHY chip). At least one of the nodes 210-1, . . . , and 210-4 may be coupled to the communication I/F 220d. The DMA controller 220j may enhance the speeds of transfers of various kinds of data performed between the communication I/F 220d and the HDD 220e.

The RAM 220b may correspond to the correspondence relationship storage unit 223. The RAM 220b reads a program stored in the ROM 220c or the HDD 220e. The RAM 220b reads a program recorded in the portable recording medium 340. The CPU 220a executes the read program, and hence, the functions of the link state information acquisition unit 221, . . . , and the overlay route setting unit 226 other than the correspondence relationship storage unit 223 may be executed. The CPU 220a executes the read program, and hence, a tunnel management method based on the tunnel manager 220 may be executed. The program may have a function corresponding to a flowchart illustrated in FIG. 5.

Figure 5:
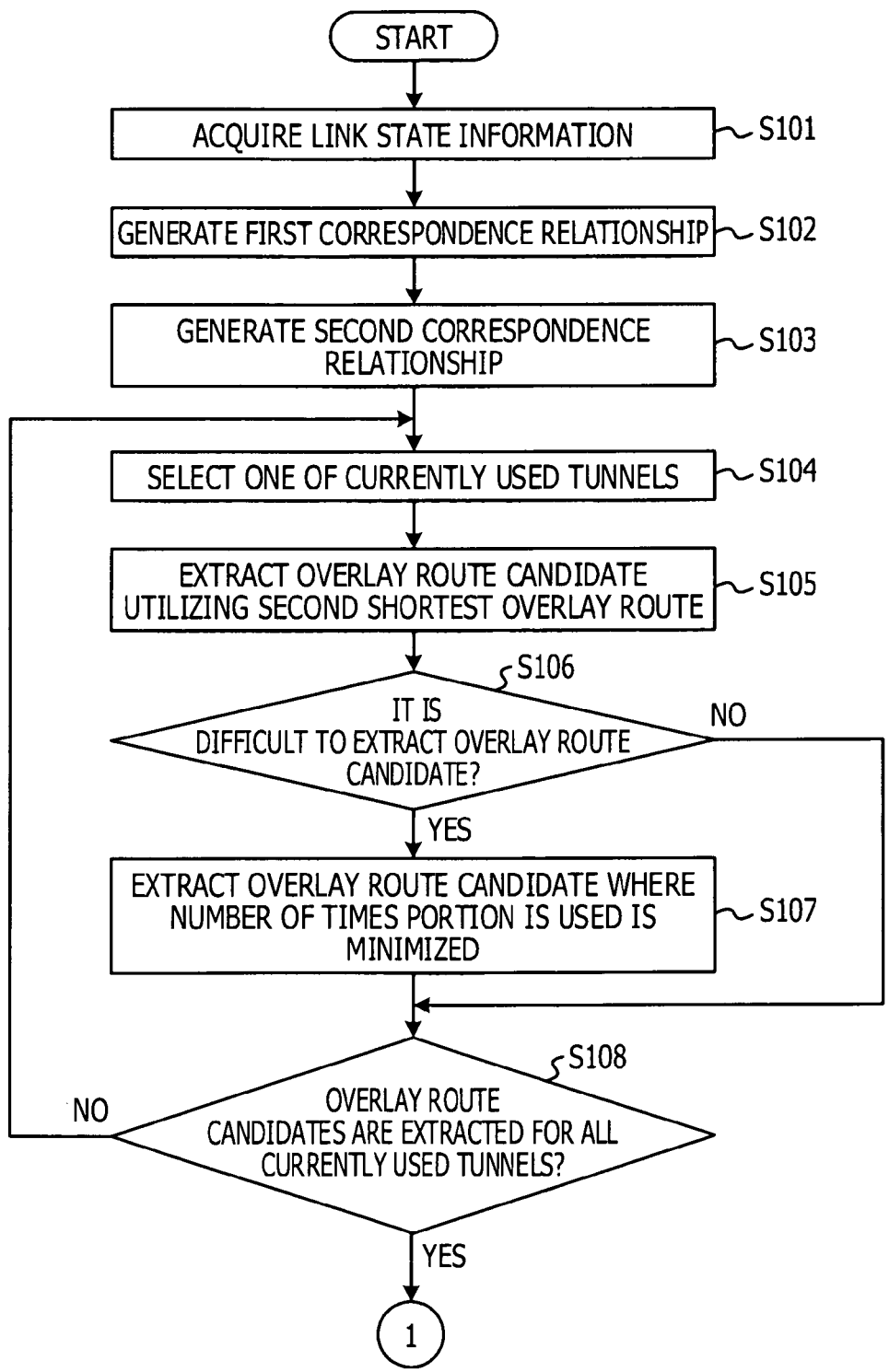
FIG. 5 illustrates an example of an operation of the tunnel manager.
Figure 6:
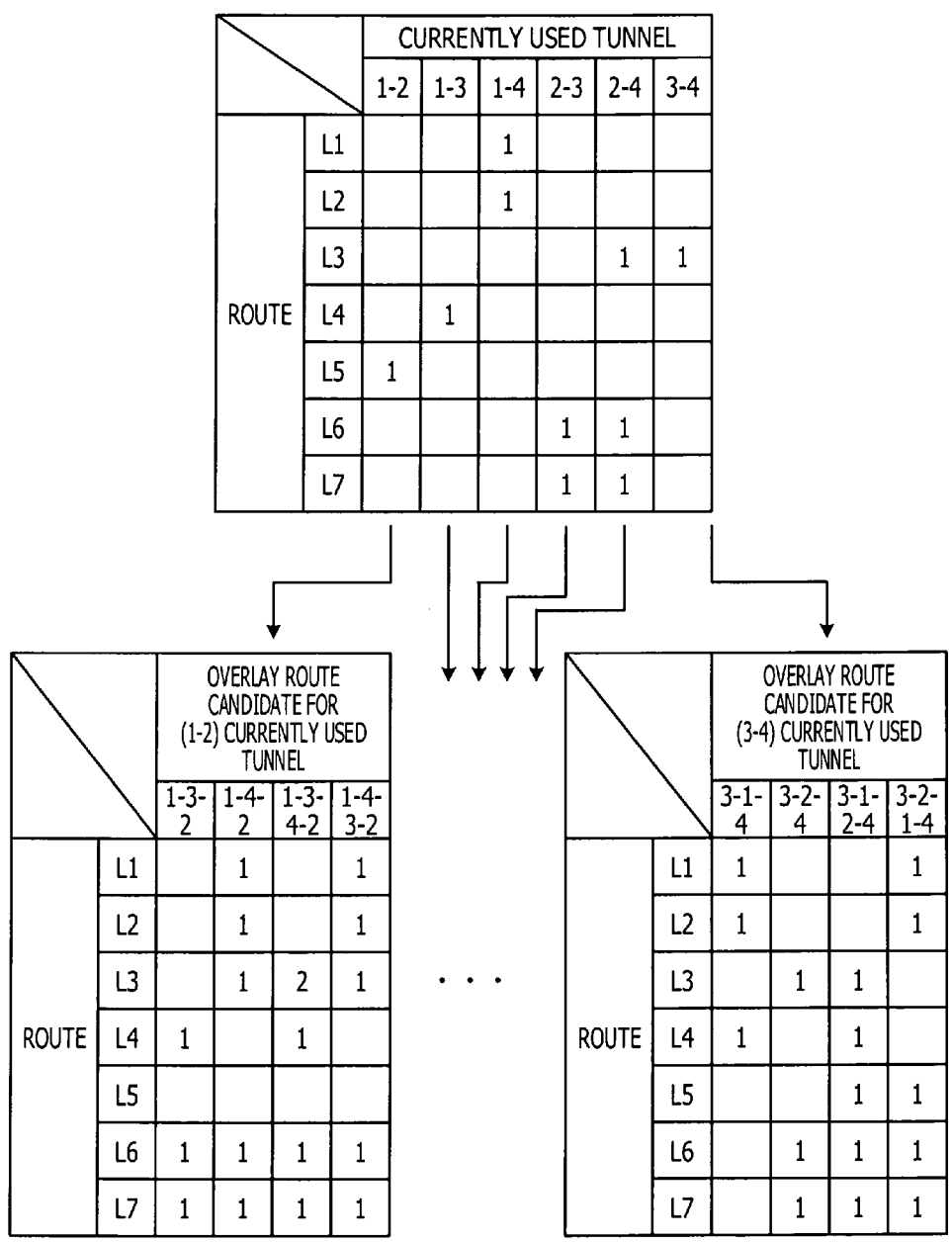
FIG. 6 illustrates an example of processing for generating a second correspondence relationship.
Figure 7:
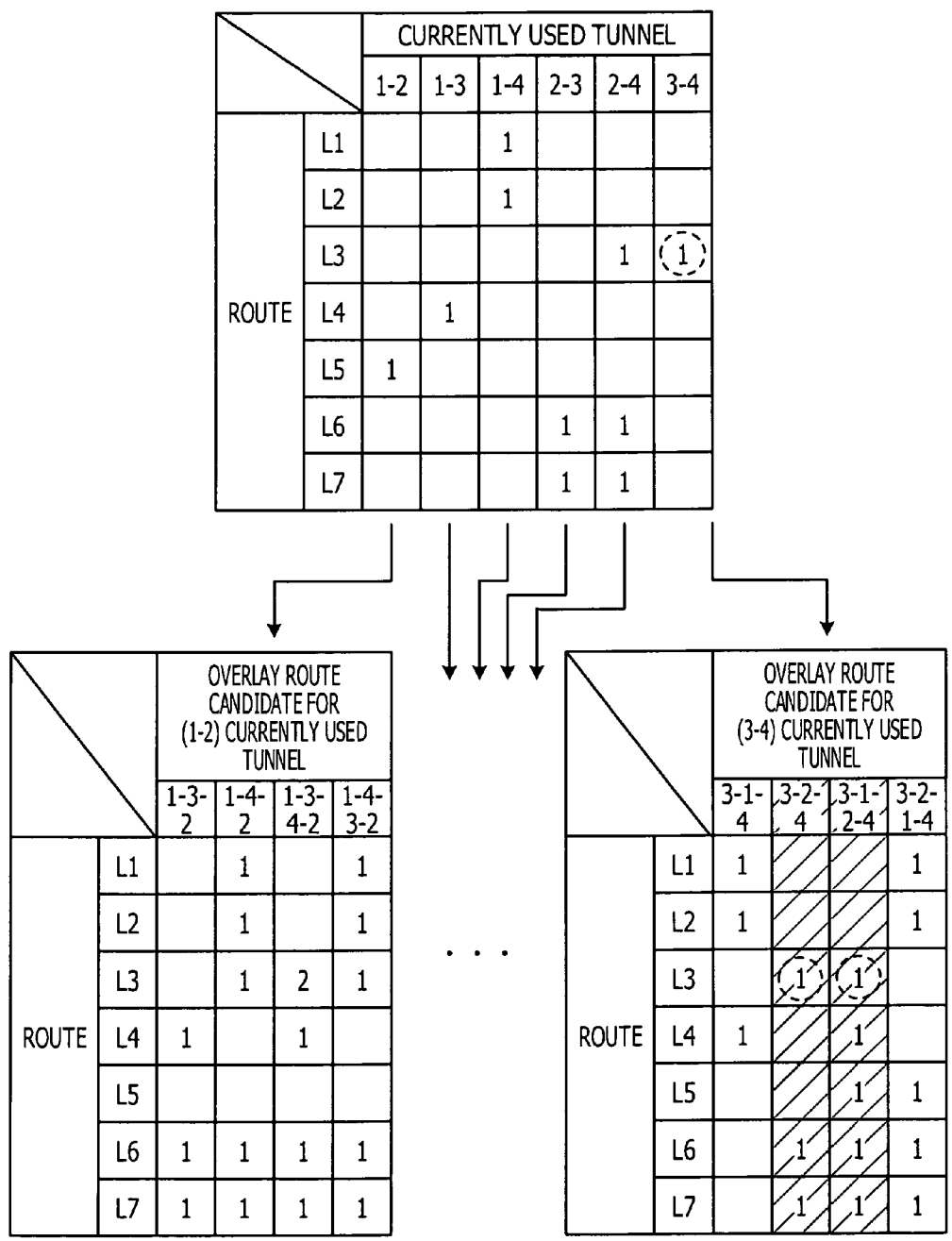
FIG. 7 illustrates an example of processing for extracting a overlay route candidate for a currently used tunnel.

FIG. 5 illustrates an example of an operation of a tunnel manager. FIG. 6 illustrates an example of processing for generating a second correspondence relationship. FIG. 7 illustrates an example of processing for extracting a overlay route candidate for an currently used tunnel.

As illustrated in FIG. 5, the link state information acquisition unit 221 acquires the link state information periodically or, non-periodically based on an instruction (operation S101). The acquisition destination of the link state information may be one of the IP routers 110-A, . . . , and IP router 110-F, or the network manager 220.

Based on the acquired link state information, the correspondence relationship generation unit 222 generates the first correspondence relationship between the first shortest routes on the IP network and the respective currently used tunnels (operation S102). Based on, for example, the acquired link state information and the least-cost route calculation method such as Dijkstra, a shortest route on the IP network between points is obtained. Based on the obtained shortest route on the IP network, the first correspondence relationship is generated.

In a case where, in FIG. 1 and FIG. 2A, a currently used tunnel between the node 210-1 and the node 210-3 is generated, a route utilizing the route "L4" coupling the IP router 110-A and the IP router 110-D to each other may be used as a first currently used tunnel. In addition to the first route, the route on the IP network "L1" coupling the IP router 110-A and the IP router 110-F to each other, the route on the IP network "L2" coupling the IP router 110-F and the IP router 110-E to each other, and the route "L3" coupling the IP router 110-E and the IP router 110-D to each other may be used as a second route. The route on the IP network "L5" coupling the IP router 110-A and the IP router 110-B to each other, the route on the IP network "L6" coupling the IP router 110-B and the IP router 110-C to each other, and the route on the IP network "L7" coupling the IP router 110-C and the IP router 110-D to each other may be used as a third route.

The cost of the first route may be "2". The cost of the second route may be "9", based on the sum of costs. The cost of the third route may be "8", based on the sum of costs. Therefore, a minimum cost based on the Dijkstra calculation method is "2", and the route "L4" is obtained as the shortest route on the IP network between the node 210-1 and the node 210-3. The shortest routes on the IP network between the node 210-1 and the node 210-2, between the node 210-1 and the node 210-4, and so forth are obtained. Based on the obtained shortest routes on the IP network, the first correspondence relationship is generated. The upper stages of FIG. 6 and FIG. 7 each illustrate the first correspondence relationship between the first shortest routes and the respective currently used tunnels. The first correspondence relationship illustrated in the upper stage of FIG. 6 illustrates a relationship between a (1-2) currently used tunnel indicating the currently used tunnel between the node 210-1 and the node 210-2, . . . , and a (3-4) currently used tunnel indicating the currently used tunnel between the node 210-3 and the node 210-4 and the routes on the IP network "L1", . . . , and "L7" used by the respective currently used tunnels. In FIG. 6, as for, for example, the (2-4) currently used tunnel, a route utilizing the routes on the IP network "L3", "L6", and "L7" is the shortest route on the IP network.

Based on the generated first correspondence relationship, the correspondence relationship generation unit 222 generates the second correspondence relationship between the second shortest routes on the IP network and respective overlay route candidates (operation S103). As illustrated in, for example, FIG. 6, based on the first correspondence relationship, the correspondence relationship generation unit 222 generates the second correspondence relationship for each currently used tunnel. The lower stages of FIG. 6 and FIG. 7 each illustrate the second correspondence relationship between the second shortest routes on the IP network and respective overlay route candidates. As illustrated in, for example, the lower state of FIG. 6, overlay route candidates for the currently used tunnel between (1-2) may include a route passing in the order of (1-3-2), a route passing in the order of (1-4-2), a route passing in the order of (1-3-4-2), and a route passing in the order of (1-4-3-2). For each route, the shortest route may be obtained based on a least-cost calculation method such as Dijkstra. As for, for example, the overlay route candidates of (1-3-2), a route utilizing the routes on the IP network "L4", "L6", and "L7" is the shortest route on the IP network. Using the same method, the shortest routes on the IP network used by the overlay route candidates of (1-4-2) to (1-4-3-2) are obtained. The second correspondence relationship between overlay route candidates for the currently used tunnel between (1-2) and the second shortest routes on the IP network is generated. Using the same method, the second correspondence relationship between overlay route candidates for the currently used tunnel between (1-3) and the second shortest routes to the second correspondence relationship between overlay route candidates for the currently used tunnel between (3-4) and the second shortest routes on the IP network are generated. The correspondence relationship generation unit 222 saves, in the correspondence relationship storage unit 223, the generated first correspondence relationship and the generated second correspondence relationship. In the second correspondence relationship illustrated in the lower stage of FIG. 6, "2" assigned to a corresponding point between the (1-3-4-2) overlay route candidate and the route on the IP network "L3" indicates that the (1-3-4-2) overlay route candidate is routed through the route on the IP network "L3" twice.

The overlay route candidate extraction unit 224 extracts the first correspondence relationship and the second correspondence relationship from the correspondence relationship storage unit 223, and selects one of currently used tunnels (operation S104). The overlay route candidate extraction unit 224 selects, for example, the (1-2) currently used tunnel.

The overlay route candidate extraction unit 224 extracts a overlay route candidate utilizing the second shortest route on the IP network not including the first shortest route on the IP network (operation S105). In a case where the overlay route candidate extraction unit 224 selects, for example, the (1-2) currently used tunnel, the (1-2) currently used tunnel of the first correspondence relationship and the (1-3-2) overlay route candidate of the second correspondence relationship are compared with each other in FIG. 7. The route on the IP network "L5" is used in, for example, the (1-2) currently used tunnel, and the routes on the IP network "L4", "L6", and "L7" are used in the (1-3-2) overlay route candidate. Therefore, since the (1-3-2) overlay route candidate uses the shortest route on the IP network not including the shortest route on the IP network used by the currently used tunnel, the (1-3-2) overlay route candidate may be extracted. Using the same method, the (1-2) currently used tunnel is compared with the (1-4-2) overlay route candidate, the (1-3-4-2) overlay route candidate, and the (1-4-3-2) overlay route candidate in order. As a result of the comparison, since every one of the overlay route candidates uses the shortest route on the IP network not including the shortest route on the IP network used by the currently used tunnel, the (1-4-2) overlay route candidate, the (1-3-4-2) overlay route candidate, and the (1-4-3-2) overlay route candidate may be extracted.

The overlay route candidate extraction unit 224 determines whether or not it is difficult to extract a overlay route candidate (operation S106). For example, in a case where a overlay route candidate is extracted, the overlay route candidate extraction unit 224 determines that the overlay route candidate is extracted (operation S106: NO), and executes subsequent processing. In a case where the overlay route candidate extraction unit 224 determines that the overlay route candidate is not extracted (operation S106: YES), the overlay route candidate extraction unit 224 extracts a overlay route candidate where the number of times a portion of the first shortest route is used is minimized (operation S107). In a case where, in FIG. 7, for example, the (1-2) currently used tunnel uses the routes on the IP network "L3", "L6", and "L7" in place of the route on the IP network "L5", the (1-2) currently used tunnel is compared with the (1-3-2) overlay route candidate, the (1-4-2) overlay route candidate, the (1-3-4-2) overlay route candidate, and the (1-4-3-2) overlay route candidate. Since every one of the overlay route candidates uses the routes on the IP network "L6" and "L7", no overlay route candidate may be extracted. In this case, since the overlay route candidates other than the (1-3-2) overlay route candidate use the route on the IP network "L3", a usage count may be "3" or "4". Since the (1-3-2) overlay route candidate does not use the route on the IP network "L3", the usage count may be "2". As a overlay route candidate where the usage count is minimized, the (1-3-2) overlay route candidate may be extracted.

The overlay route candidate extraction unit 224 determines whether or not overlay route candidates are extracted for all the currently used tunnels (operation S108). For example, in a case where the overlay route candidate extraction unit 224 only selects the (1-2) currently used tunnel, the overlay route candidate extraction unit 224 determines that overlay route candidates are not extracted for all the currently used tunnels (operation S108: NO), the processing operations in the operation S104 and the operation S105 are repeated. Therefore, in FIG. 7, for example, the (3-4) currently used tunnel is compared with the (3-1-4) overlay route candidate to the (3-2-1-4) overlay route candidate in order. The (3-2-4) overlay route candidate and the (3-1-2-4) overlay route candidate each include the route "L3". Therefore, in a case where a failure occurs in the route "L3", since the (3-2-4) overlay route candidate and the (3-1-2-4) overlay route candidate use the route on the IP network "L3", it may become difficult to route the currently used tunnel. Therefore, as illustrated by hatched lines in the lower stage of FIG. 7, the (3-2-4) overlay route candidate and the (3-1-2-4) overlay route candidate are excluded, and the (3-1-4) overlay route candidate and the (3-2-1-4) overlay route candidate are extracted. In a case where the candidate extraction unit 224 determines that overlay route candidates are extracted for all the currently used tunnels (operation S108: YES), subsequent processing is executed.

A overlay route candidate unable to connect a corresponding currently used tunnel in a case where a failure occurs may be excluded. For example, several kinds of overlay route candidates able to connect a corresponding currently used tunnel in a case where a failure occurs may be extracted. For example, overlay route candidates for a corresponding currently used tunnel, which withstand a failure to occur on the IP network 100, are extracted. In a case where, for example, the number of nodes is large, for example all route tunnels are not set in a corresponding node in accordance with the number of nodes (the setting of a full mesh), and some overlay routes are set in the node. Therefore, a load on the tunnel manager 220 for managing the overlay routes may be reduced.

Figure 8:
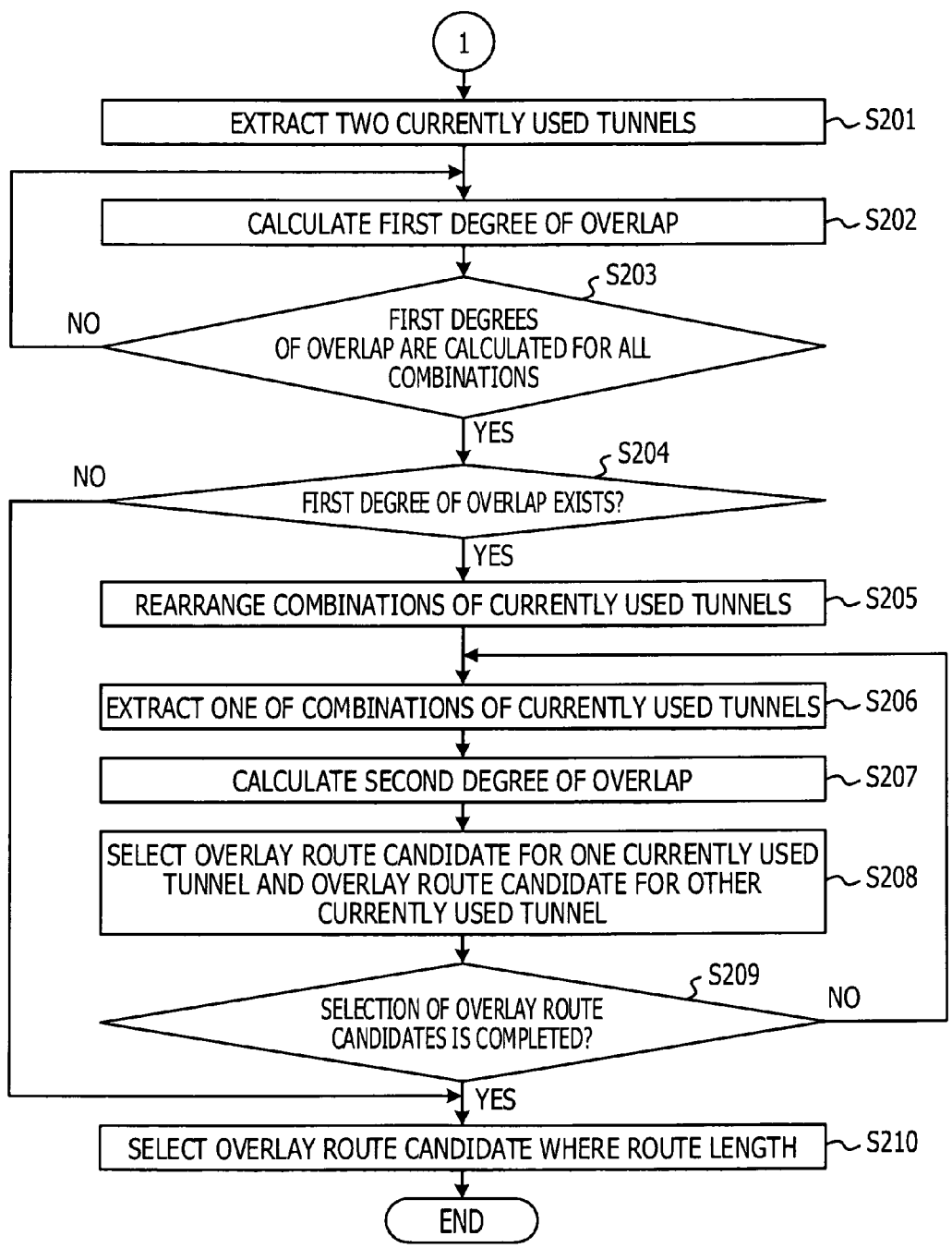
FIG. 8 illustrates an example of an operation of a tunnel manager.
Figure 9:
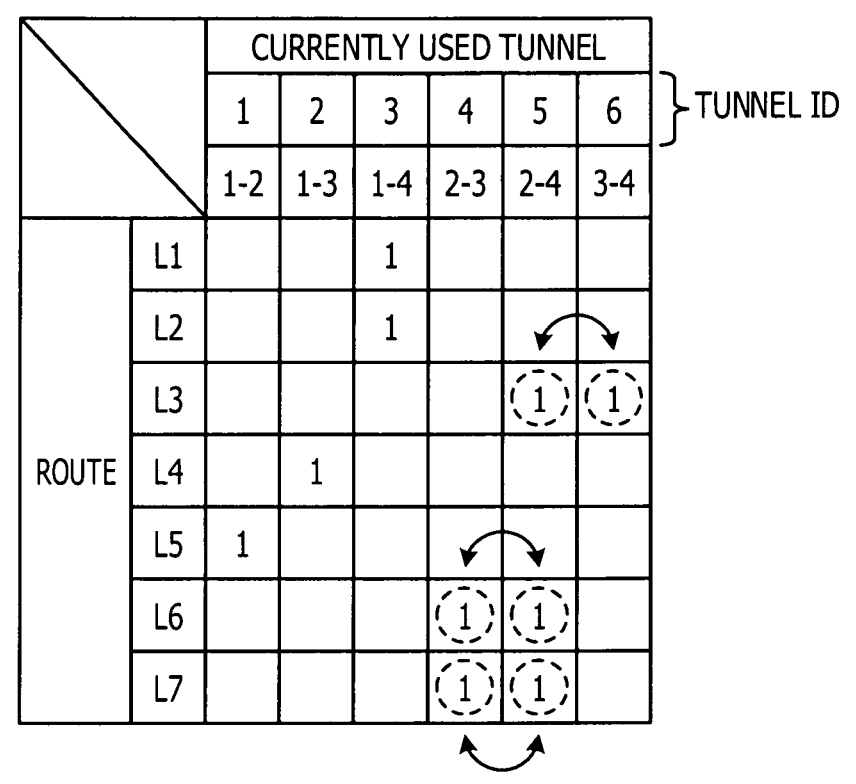

FIG. 8 illustrates an example of the operation of a tunnel manager. FIG. 9 illustrates an example of processing for calculating the first degree of overlap. FIG. 10 illustrates an example of processing for selecting a overlay route candidate in a case where a first degree of overlap exists. FIG. 11 illustrates an example of processing for selecting a overlay route candidate in a case where a first degree of overlap does not exist.

In a case where the overlay route candidate extraction unit 224 determines that overlay route candidates are extracted for all the currently used tunnels, the overlay route candidate extraction unit 224 extracts two currently used tunnels from the first correspondence relationship (operation S201). In FIG. 9, the overlay route candidate extraction unit 224 extracts, for example, the (1-2) currently used tunnel to which a tunnel ID, "1", is assigned and the (1-3) currently used tunnel to which a tunnel ID, "2", is assigned.

The degree-of-overlap calculation unit 225 calculates the first degree of overlap between the first shortest route used by one currently used tunnel and the third shortest route used by the other currently used tunnel (operation S202). In a case where the overlay route candidate extraction unit 224 extracts the (1-2) currently used tunnel and the (1-3) currently used tunnel, the shortest route on the IP network, "L5", used by the (1-2) currently used tunnel and the shortest route on the IP network, "L4", used by the (1-3) currently used tunnel do not overlap with each other in FIG. 9. Since no overlap exists, the first degree of overlap, "0", is calculated.

The degree-of-overlap calculation unit 225 determines whether or not the first degrees of overlap are calculated for all the combinations of the currently used tunnels (operation S203). In a case where the overlay route candidate extraction unit 224 only calculates the first degree of overlap for, for example, the combination of the (1-2) currently used tunnel and the (1-3) currently used tunnel, the degree-of-overlap calculation unit 225 may determine that the first degrees of overlap are not calculated for all the combinations of the currently used tunnel (operation S203: NO). In this case, the processing operations in the operation S202 and the operation S203 are repeated. In FIG. 9, since, for example, the shortest route on the IP network, "L6" and "L7", used by the (2-3) currently used tunnel and the shortest route on the IP network, "L6" and "L7", used by the (2-4) currently used tunnel overlap with each other, the first degree of overlap, "2", is calculated. In the same way, in a case of the combination of the (2-4) currently used tunnel and the (3-4) currently used tunnel, the first degree of overlap, "1", may be calculated.

In a case where the degree-of-overlap calculation unit 225 determines that the first degrees of overlap are calculated for all the combinations of the currently used tunnels (operation S203: YES), the degree-of-overlap calculation unit 225 determines whether or not the first degree of overlap exists (operation S204). In a case where, for example, the first degrees of overlap, "1" and "2", exist, the degree-of-overlap calculation unit 225 determines that the first degree of overlap exists (operation S204: YES). In a case where the degree-of-overlap calculation unit 225 determines that the first degree of overlap does not exist (operation S204: NO), a processing operation in an operation S210 may be executed.

In a case where the degree-of-overlap calculation unit 225 determines that the first degree of overlap exists, the degree-of-overlap calculation unit 225 rearranges the combinations of the currently used tunnels in order from the maximum first degree of overlap (operation S205). Therefore, as illustrated in FIG. 10, the combination of the (2-3) currently used tunnel and the (2-4) currently used tunnel where the first degree of overlap is "2" is arranged at the beginning, and subsequently, the combination of the (2-4) currently used tunnel and the (3-4) currently used tunnel where the first degree of overlap is "1" is arranged.

The degree-of-overlap calculation unit 225 extracts one of the combinations of the currently used tunnels in order from the maximum first degree of overlap (operation S206). The combination of, for example, the (2-3) currently used tunnel and the (2-4) currently used tunnel may be extracted first.

The degree-of-overlap calculation unit 225 calculates the second degree of overlap between the second shortest route on the IP network used by a overlay route candidate for one currently used tunnel and the fourth shortest route on the IP network used by a overlay route candidate for the other currently used tunnel (operation S207). As illustrated in FIG. 10, in a case where, for example, the (2-1-3) overlay route candidate and the (2-1-4) overlay route candidate are compared with each other, the route on the IP network "L5" overlaps. Therefore, the second degree of overlap, "1", is calculated. In a case where, for example, the (2-1-4-3) overlay route candidate and the (2-1-4) overlay route candidate are compared with each other, the routes on the IP network "L1", "L2", and "L5" overlap. Therefore, the second degree of overlap, "3", is calculated. Since the (2-4-3) overlay route candidate, the (2-4-1-3) overlay route candidate, and so forth are already excluded from overlay route candidates, the (2-4-3) overlay route candidate, the (2-4-1-3) overlay route candidate, and so forth may be excluded from targets for comparison.

The overlay route candidate extraction unit 224 selects a overlay route candidate for one currently used tunnel and a overlay route candidate for the other currently where the minimum second degree of overlap is obtained (operation S208). Since, for example, the second degree of overlap, "1", and the second degree of overlap, "3", are calculated, the second degree of overlap, "1", is a minimum. Therefore, the (2-1-3) overlay route candidate and the (2-1-4) overlay route candidate, which serve as a basis for calculating the second degree of overlap, "1", may be selected, and route tunnels may be established.

The overlay route candidate extraction unit 224 determines whether or not selection of overlay route candidates is completed (operation S209). Since the processing operations in the operations S206 to S208 are not executed for, for example, the first degree of overlap, "1", the overlay route candidate extraction unit 224 determines that the selection of overlay route candidates is not completed (operation S209: NO). The processing operations in the operations S206 to S208 are executed for the first degree of overlap, "1", and as illustrated in FIG. 10, the second degree of overlap, "2", and the second degree of overlap, "3", are calculated. The second degree of overlap, "2", is a minimum. Therefore, the (2-1-4) overlay route candidate and the (3-1-4) overlay route candidate, which serve as a basis for calculating the second degree of overlap, "2", are selected, and route tunnels are established. Even if failures simultaneously occur in a plurality of currently used tunnels, the concentration of a communication load in a specific route is reduced, and a route tunnel may be established. If, in a case where failures simultaneously occur in, for example, the (2-4) currently used tunnel and the (3-4) currently used tunnel, the (2-1-4) route tunnel and the (3-2-1-4) route tunnel are set in the lower stage of FIG. 10 in advance, for example, before failure occurrences or before start of an operation, the both of the (2-1-4) route tunnel and the (3-2-1-4) route tunnel use the routes on the IP network "L1", "L2", and "L5", and hence, a communication load may be concentrated in these routes. In a case where, for example, the (2-1-4) route tunnel and the (3-1-4) route tunnel are set, the concentration of a communication load in the route on the IP network "L5" may be reduced. Congestion may be reduced by the distribution of a communication load.

In a case where the overlay route candidate extraction unit 224 determines that the selection of overlay route candidates is completed (operation S209: YES), the overlay route candidate extraction unit 224 selects a overlay route candidate where the route length of the second shortest route on the IP network is minimized (operation S210). The operation S210 may be a processing operation executed for a overlay route candidate for the currently used tunnel for which the first degree of overlap, "0", is calculated. As illustrated on the left side of the upper stage of FIG. 11, in, for example, overlay route candidates for the (1-2) currently used tunnel, the (1-3-2) overlay route candidate uses the routes on the IP network "L4", "L6", and "L7". Therefore, the route length, "3", of the second shortest route is obtained. In the same way, as for each of the remaining overlay route candidates, the route length, "5", of the second shortest route is obtained. Therefore, the (1-3-2) overlay route candidate where the route length, "3", which is a minimum, is obtained is selected, and a route tunnel is established.

As illustrated on the right side of the upper stage of FIG. 11, in overlay route candidates for the (1-3) currently used tunnel, both the route lengths of the (1-2-3) overlay route candidate and the (1-4-3) overlay route candidate are "3". In a case where, for example, the route lengths are the same, a overlay route candidate where the sum of costs is minimized is selected from among the two overlay route candidates.

Since, for example, the sum of costs of the (1-2-3) overlay route candidate is "8" and the sum of costs of the (1-4-3) overlay route candidate is "9", the (1-2-3) overlay route candidate is selected, and a route tunnel is established. As illustrated in the lower stage of FIG. 11, in overlay route candidates for the (1-4) currently used tunnel, the (1-3-4) overlay route candidate is selected, and a overlay route is established.

Figure 12:
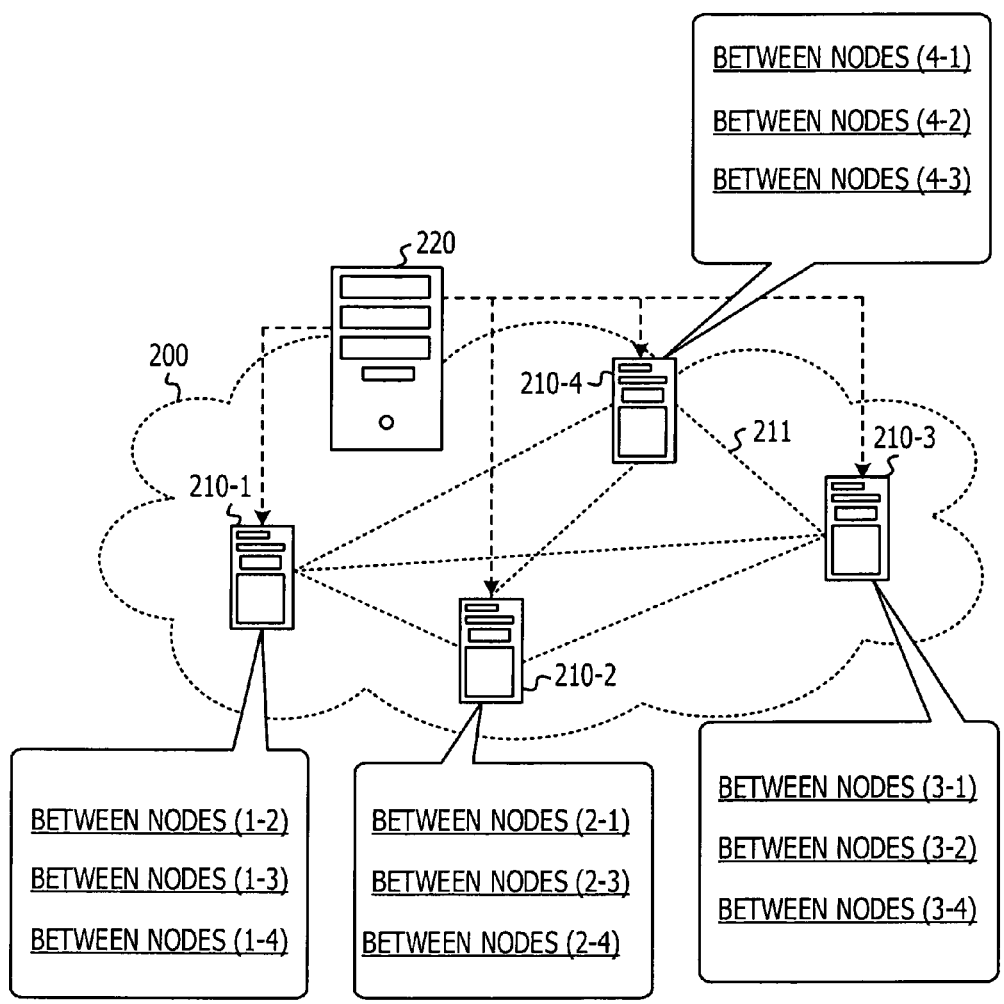
FIG. 12 illustrates an example of a tunnel.

FIG. 12 illustrates an example of a tunnel. In FIG. 12, tunnels set in the respective nodes 210-1, . . . , and 210-4 are illustrated. The tunnel manager 220, for example, the tunnel setting unit 226, sets currently used tunnels and overlay routes for the respective nodes 210-1, . . . , and 210-4. In, for example, the node 210-1, the (1-2) currently used tunnel is set between the nodes (1-2). The (1-3-2) overlay route established by the above-mentioned processing is set. In the node 210-1, the same setting may be executed between the nodes (1-3) and between the nodes (1-4). Such a setting may be executed for the nodes 210-2, 210-3, and 210-4. In the node 210-1, the (1-3) currently used tunnel is set between the nodes (1-3) and the (1-4) currently used tunnel is set between the nodes (1-4). The (1-2-3) overlay route and the (1-3-4) overlay route established by the above-mentioned processing are set. Such a setting may be executed for the nodes 210-2, 210-3, and 210-4. In the node 210-2, the (2-1) currently used tunnel is set between the nodes (2-1), the (2-3) currently used tunnel is set between the nodes (2-3), and the (2-4) currently used tunnel is set between the nodes (2-4). The (2-3-1) overlay route, the (2-1-3) overlay route and the (2-1-4) overlay route established by the above-mentioned processing are set. In the node 210-3, the (3-1) currently used tunnel is set between the nodes (3-1), the (3-2) currently used tunnel is set between the nodes (3-2), and the (3-4) currently used tunnel is set between the nodes (3-4). The (3-2-1) overlay route, the (3-1-2) overlay route and the (3-1-4) overlay route established by the above-mentioned processing are set. In the node 210-4, the (4-1) currently used tunnel is set between the nodes (4-1), the (4-2) currently used tunnel is set between the nodes (4-2), and the (4-3) currently used tunnel is set between the nodes (4-3). The (4-3-1) overlay route, the (4-1-2) overlay route and the (4-1-3) overlay route established by the above-mentioned processing are set. As a result, currently used tunnels and route tunnels are set in the respective nodes 210-1, . . . , and 210-4.

In the overlay network 200 in which tunnels are established, in a case where a failure occurs in, for example, the route on the IP network "L3" (see FIG. 2A), communication in the (2-4) currently used tunnel utilizing the route on the IP network "L3" (see the upper stage of FIG. 6) may be interrupted. In a case where, as an overlay route for the (2-4) currently used tunnel, for example, the (2-3-4) overlay route or the (2-1-3-4) overlay route is set in advance, the both thereof use the route on the IP network "L3" (see the left side of the lower stage of FIG. 10), and hence, it may be difficult for the overlay route to connect the currently used tunnel. In a case where communication in the currently used tunnel is interrupted when an overlay route utilizing, for example, the route on the IP network "L3" is excluded from overlay route candidates, an overlay route may be able to connect the currently used tunnel using the routes on the IP network "L1", "L2", and "L4" (see the left side of the lower stage of FIG. 10).

FIG. 13 illustrates an example of selection of a overlay route candidate. In FIG. 13, weighting is set in each of the routes on the IP network "L1", . . . , and "L7" by a route weight indicating a relay load, for example, a metric. The setting of weighting may be performed in advance. The weighting may be performed by the above-mentioned cost. In each of overlay route candidates illustrated in FIG. 13, a data value is calculated by multiplying the number of times of being routed through a IP route by a route weight. The sum of the individual data values is calculated as an index sum for each overlay route candidate. In, for example, the (1-3-2) overlay route candidate, the index sum, "12", is calculated. An overlay route candidate having a minimum index sum among the index sums calculated for the respective overlay route candidates may be established as an overlay route.

In each of the nodes 210-1, . . . , and 210-4, a processing delay corresponding to the performance of the respective node be set. The setting of the processing delay may be performed in advance. Since the (1-3-2) overlay route candidate uses, for example, the nodes 210-1, 210-3, and 210-2, the sum of the processing delays is calculated as a processing delay sum, "16". In this way, a overlay route candidate having a minimum processing delay sum among the processing delay sums calculated for the respective overlay route candidates may be established as an overlay route. An overlay route candidate where the number of being routed through the nodes 210-1, . . . , and 210-4 is reduced may be established as an overlay route. In this case, for example, not only the (1-4-2) overlay route candidate but also the (1-3-2) overlay route candidate may be established as an overlay route.

The above-mentioned embodiments may be altered or modified. For example, two functions may be realized by one device, and one function may be distributed to two or more devices. In place of the term, "relay", a term, "forwarding", may be used. The link information acquisition unit 221, . . . , and the overlay route setting unit 226 may be realized by the tunnel manager 220. The configurations of these may be included in the node 210-1, . . . , and 210-4, and the link information acquisition unit 221, . . . , and the overlay route setting unit 226 may be realized by the individual nodes 210-1, . . . , and 210-4. In this case, the information of a tunnel extracted by the overlay route candidate extraction unit 224 may be transmitted to the tunnel manager 220. The hardware configurations of the node 210-1, . . . , and 210-4 may be substantially equal to or similar to the configuration of the tunnel manager 220.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:
1. A tunnel management device comprising:
a central processing unit configured to manage a tunnel that establishes a virtual network to be overlaid on an IP network; and
a memory coupled to the central processing unit,
wherein the central processing unit:
acquires a first route on the IP network which is used by a first tunnel from a first node of the virtual network to a second node of the virtual network;

acquires one or more second tunnels in the virtual network that are bypass routes of the first tunnel from the first node to the second node and use respective second routes on the IP network;

extracts, from among the one or more second tunnels, a second tunnel where a number of times a portion of the first route on the IP network is used in the second route of the second tunnel in the virtual network is minimized, calculates a first degree of overlap between the first route on the IP network and a third route on the IP network used by a third tunnel and a second degree of overlap between the second route and a fourth route on the IP network where the number of times a portion of the third route is used is minimized; and selects the extracted second tunnel and a fourth tunnel, based on the first degree of overlap and the second degree of overlap.

2. The tunnel management device according to claim 1, wherein the central processing unit:

acquires, from a network management device that manages the IP network or packet relay devices that relay packets, coupling state information including a coupling state between the packet relay devices; and extracts the second tunnel, based on comparison between the first route on the IP network and the second route on the IP network, individually obtained based on the coupling state information.

3. The tunnel management device according to claim 1, wherein the central processing unit extracts the second tunnel utilizing a route on the IP network not including the portion of the first route on the IP network.

4. The tunnel management device according to claim 1, wherein the central processing unit:

selects, when a plurality of second degrees of overlap are calculated, the second tunnel and the fourth tunnel where the minimum second degree of overlap is obtained.

5. The tunnel management device according to claim 1, wherein the central processing unit:

extracts, when a plurality of first degrees of overlap are calculated, the second tunnel and the fourth tunnel in order from the maximum first degree of overlap.

6. The tunnel management device according to claim 1, wherein the central processing unit:

selects, when the first degree of overlap does not exist, the second tunnel where a route length of the second route on the IP network is minimized.

7. A communication control device comprising:

a central processing unit configured to establish a virtual network to be overlaid on an IP network, using tunnels, and control communication performed in the IP network, wherein the central processing unit:

acquires a first route on the IP network which is used by a first tunnel from a first node of the virtual network to a second node of the virtual network;

acquires one or more second tunnels in the virtual network that are bypass routes of the first tunnel from the first node to the second node and use respective second route on the IP network;

extracts, from among the one or more second tunnels, a second tunnel where the number of times a portion of the first route on the IP network is used in the second route of the second tunnel in the virtual network is minimized;

transmits information of the second tunnel to a tunnel management device that manages the tunnels, calculates a first degree of overlap between the first route and a third route on the IP network used by a third tunnel and a second degree of overlap between the second route and a fourth route in the IP network where the number of times a portion of the third route on the IP network is used is minimized; and selects extracted the second tunnel and a fourth tunnel, based on the first degree of overlap and the second degree of overlap.

8. The communication control device according to claim 7, wherein the central processing unit:

acquires, from a network management device that manages the IP network or packet relay devices that relay packets, coupling state information including a coupling state between the packet relay devices; and extracts the second tunnel, based on comparison between the first route and the second route on the IP network, individually obtained based on the coupling state information.

9. The communication control device according to claim 7, wherein the central processing unit extracts the second tunnel utilizing an IP route not including the portion of the first route on the IP network.

10. A tunnel management method, comprising:

acquiring, by a computer, a first route on an IP network which is used by a first tunnel from a first node of a virtual network to be overlaid on the IP network to a second node of the virtual network;

acquiring one or more second tunnels in the virtual network that are bypass routes of the first tunnel from the first node to the second node and use respective second routes on the IP network;

extracting, from among the one or more second tunnels, a second tunnel where the number of times a portion of the first route on the IP network is used in the second route of the second tunnel in the virtual network is minimized;

calculating a first degree of overlap between the first route and a third route on the IP network used by a third tunnel and a second degree of overlap between the second route and a fourth route on the IP network where the number of times a portion of the third route on the IP network is used is minimized; and selecting the extracted second tunnel and a fourth tunnel, based on the first degree of overlap and the second degree of overlap.

11. The tunnel management method according to claim 10, further comprising:

acquiring, from a network management device that manages the IP network or packet relay devices that relay packets, coupling state information including a coupling state between the packet relay devices; and extracting the second tunnel, based on comparison between the first route and the second route on the IP network, individually obtained based on the coupling state information.

12. The tunnel management method according to claim 10, further comprising:
   extracting the second tunnel utilizing a route on the IP network not including the portion of the first route on the IP network.

* * * * *